UNITED STATES PATENT OFFICE.

ALBERT STUTZER, OF KÖNIGSBERG, GERMANY, ASSIGNOR TO BAYERISCHE STICKSTOFF-WERKE A. G., OF BERLIN, GERMANY, A CORPORATION OF GERMANY.

PROCESS OF IMPROVING THE FERTILIZING ACTION OF LIME-NITROGEN.

1,185,731. Specification of Letters Patent. Patented June 6, 1916.

No Drawing. Application filed September 12, 1911. Serial No. 648,920.

*To all whom it may concern:*

Be it known that I, ALBERT STUTZER, a subject of the German Emperor, and residing at Königsberg, Kingdom of Prussia, Germany, have invented a certain new and useful Improved Process of Improving the Fertilizing Action of Lime-Nitrogen, of which the following is a specification.

The subject-matter of my invention is a process for improving the fertilizing action of lime-nitrogen.

Lime-nitrogen used as a fertilizer contains as its most valuable constituent calcium cyanamid $CaCN_2$. Owing to the action of carbonic acid and water in the ground free cyanamid and calcium carbonate are formed. The cyanamid is first converted in the soil by further hydrolysis into urea and then into ammonium carbonate:—

I. $H_2NCN + H_2O = CO(NH_2)_2$
II. $CO(NH_2)_2 + 2H_2O = (NH_4)_2CO_3$

For the practical employment of lime-nitrogen it is of great importance that the cyanamid can be converted rapidly and unimpededly into the useful urea.

Nitrates are particularly valuable for the nourishment of plants. If the active value of nitrogen in nitrate be assumed equal to 100, the active value of nitrogen in lime-nitrogen is in many cases only 80. Sometimes it may rise to about 90, in many kinds of soil and in unfavorable conditions of the weather it falls however to 70, 60 and 50% of the active value of the nitrate nitrogen. A good action is obtained when calcium cyanamid is rapidly converted into urea.

Now I have found that when lime-nitrogen is mixed with certain colloidal substances before being scattered on the land, apparently owing to contact action, e. g. with colloidal ferric hydroxid as found for instance in bog-iron ore, the conversion of the cyanamid into urea can be accelerated and the active value of the lime-nitrogen increased. This is shown by the following example relating to kilograms per Prussian hectare.

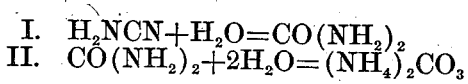

| Amount of lime-nitrogen per hectare. | Yield of oats. |
|---|---|
| (a) 40 kg. without admixtures | 4205 kg. |
| (b) 40 kg. mixed with 80 kg. ferric hydroxid | 4841 |
| Increased crop | 636 kg. |
| (c) 60 kg. without admixtures | 4745 kg. |
| (d) 60 kg. mixed with 120 kg. ferric hydroxid | 4873 |
| Increased crop | 128 kg. |

The increase of the crop in (b) as compared with (a) is very considerable. The smaller increase in (c) as compared with (d) must be explained by the maximum harvest attainable under the existing climatic conditions being approximately obtained by 60 kg. nitrogen without admixtures. However, the ferric hydroxid intimately mixed with the lime-nitrogen before use was able to cause the nitrogen to have a greater value which can only be explained by the conversion of the cyanamid into urea being accelerated by the admixed colloidal substance, ferric hydroxid. Similar tests have also been made with rye sown on the 20th September 1909 and strewed with lime-nitrogen on the 2nd March 1910. The latter was partially mixed with ferric hydroxid and partially not so mixed. Profitable increased crops could undoubtedly be obtained by the addition of this colloidal substance, even if such increases were not so high as in the case of oats, because in the latter case the lime-nitrogen was put into the soil before the seed, whereas in the case of rye it was thrown only on the surface during the vegetation period.

It has been determined by experiment in the laboratory that not only ferric hydroxid, but also other colloidal substances, such as aluminium hydroxid in colloidal form and non-crystalline, have a similar, even if weaker action like that of ferric hydroxid.

From observations of Ulpiani (*Rendiconta Della Società Chimica Italiana*, 1910, series 2, vol. 2, No. 4, p. 84) it is known that the conversion of cyanamid into urea is connected with the existence of colloidal substances, particularly of iron and aluminium compounds in the ground. Ulpiani writes to the following effect: "It has been stated that the colloids bring about the conversion by catalysis in connection with the large surface which is presented. The calcium cyanamid is first absorbed and then hydrolized." The action of lime-nitrogen is, however, itself materially increased in ground relatively rich in ferric hydroxid, when it is intimately mixed, according to the present invention, with a quantity of ferric hydroxid which is about twice as great as the quantity of the nitrogen contained in the lime-nitrogen. In addition, a binder which cements the constituents of this mixture, e. g. a little beet molasses, may be added in order to cause the mass to remain moderately moist and, when spreading the fertilizer, to prevent the lime-nitrogen being partially separated from the ferric hydroxid.

The special technical effect of the deliberate admixture of colloidal substances with lime-nitrogen consists, in addition, in a fertilizer being obtained which, in contradistinction to unmixed lime-nitrogen, can be employed even in soils poor in bacteria, because the colloidal substances partially substitute the bacterial action or materially aid the same. Heretofore it was scarcely possible usefully to employ lime-nitrogen in ground poor in bacteria, e. g. sandy ground, moors and the like, because the cyanamid is here converted too slowly into urea.

I claim:—

1. The hereindescribed process of increasing the action of lime-nitrogen as a fertilizer, which consists in intimately mixing with lime-nitrogen before its employment as a fertilizer a hydroxid of a metal readily convertible into the colloidal state for accelerating the production of urea and increasing the active value of the lime-nitrogen compound.

2. The hereindescribed process of increasing the action of the lime-nitrogen as a fertilizer, which consists in intimately mixing colloidal ferric hydroxid with lime-nitrogen before its employment as a fertilizer for accelerating the production of urea and increasing the active value of the lime-nitrogen compound.

3. The herein described process of increasing the action of lime nitrogen as a fertilizer, which consists in intimately mixing ferric hydroxid and beet molasses therewith before employing the same as a fertilizer.

In testimony whereof I have signed my name to this specification in the presence of two witnesses.

ALBERT STUTZER.

Witnesses:
WOLDEMAR HAUPT,
HENRY HASPER.